United States Patent
Lang

[15] 3,703,135
[45] Nov. 21, 1972

[54] MULTIPLE IMAGE FILM EXPOSURE AND PROJECTION SYSTEM

[72] Inventor: Paul Wentworth Lang, Westlake Village, Calif.

[73] Assignee: Michael H. du Pont, Los Angeles, Calif.; a part interest

[22] Filed: March 15, 1971

[21] Appl. No.: 124,010

[52] U.S. Cl. ........................................95/36, 355/54
[51] Int. Cl. ..............................................G03b 19/07
[58] Field of Search ...............95/4.5, 11, 36; 355/54

[56] References Cited

UNITED STATES PATENTS

| | | | |
|---|---|---|---|
| 3,202,069 | 8/1965 | Cummins | 95/36 |
| 3,442,588 | 5/1969 | Squassoni | 355/54 |
| 3,173,348 | 2/1965 | Betinis | 273/186 X |
| 3,016,812 | 1/1962 | Chatlain | 95/11 |
| 3,122,075 | 2/1964 | Klyce | 95/4.5 |
| 2,944,471 | 7/1960 | Drillick | 95/4.5 |

Primary Examiner—John M. Horan
Attorney—Pastoriza & Kelly

[57] ABSTRACT

A plurality of individual image forming lenses provided in rows and columns in fixed relationship to each other is positioned front of a single film frame upon which rows and columns of small areas are to be exposed to different pictures such as a microfiche. Each lens has associated with it an individual shutter which is normally closed. Any one scene to be exposed to a given area on the film can be exposed by opening only the shutter associated with the corresponding lens positioned to project the scene on the particular area. Thus by sequentially opening and closing the various shutters as the scenes are changed, multiple images are formed on the main film frame in desired rows and columns without having to move the film itself or the camera. A reverse procedure is provided for reading out any one of the individual pictures formed on the film.

1 Claim, 4 Drawing Figures

3,703,135

INVENTOR.
PAUL WENTWORTH LANG
BY Pastoriza & Kelly
ATTORNEYS

MULTIPLE IMAGE FILM EXPOSURE AND PROJECTION SYSTEM

This invention relates generally to photographing and projection techniques and more particularly to the exposure and projection of selected pictures from a number of rows and columns of pictures on a single film frame.

BACKGROUND OF THE INVENTION

It is now common practice to store information on film frames which may correspond approximately to the size of an index card. Such a film frame is known in the art as "microfiche" film and includes a plurality of individual pictures on the frame arranged in a desired pattern; for example, in rows and columns. In some instances, an entire treatise of perhaps fifty to sixty pages can thus be incorporated in a single microfiche film frame.

While the foregoing film data storage system is very useful for certain types of data, the actual exposure of a microfiche film frame to provide the various rows of pictures involves certain difficulties. For example, to expose successive small areas on the microfiche film frame to define a row and also to produce a plurality of such rows to fill the entire film frame requires that the entire camera mechanism move in both axes. Thus, incremental or step-like movements between successive exposures must be effected in the longitudinal axis to provide the rows of pictures and incremental steps must be effected in a transverse axis when moving from one exposed row to a new row for subsequent exposure of pictures. Moreover, at the end of each row the mechanism must be returned to the start of the next row, and similarly it must be returned at the end of the motion in the other axis. Hence, the term "step and repeat cameras" is employed for such apparatus. The mechanism for effecting such movements is large and bulky and the operative speed is relatively low.

It is often important to be able to record on microfilm data provided from a computer output. This data is normally displayed on the face of a cathode ray tube and is considerably smaller than a printed page which might normally be photographed in a conventional operation. It is possible, accordingly to use a smaller and more compact camera when recording computer output, but when microfiche is to be produced with conventional equipment requiring motion in two axes, reduction in size is difficult. Further, the data from the cathode ray tube to be recorded can appear in rapid sequence and when an entire camera mechanism must be incrementally shifted along two axes to record the successive scenes or images appearing on the tube, equipment presently available is simply not capable of keeping up with the rapid output from the computers.

BRIEF DESCRIPTION OF THE PRESENT INVENTION

With the foregoing considerations in mind, my invention contemplates an improved method and apparatus for successively exposing small areas of a given film frame such as a microfiche film frame to provide a plurality of individual pictures on the frame arranged in a desired pattern without the necessity of moving either the camera or the film frame. As a consequence, very rapid successive exposure of the small areas on the given film frame can be carried out without limitations heretofore imposed by the inertia of bulky equipment. Moreover, all of the complicated mechanical arrangements required to move the equipment in incremental steps is avoided.

Briefly, the method of the invention includes the steps of positioning the given frame to be exposed in a camera which camera is stationary. A plurality of individual image forming lenses is then provided in front of the film frame positioned to project multiple images of a single scene defining one picture on the film frame. The images respectively occupy the small areas in the desired pattern such as in rows and columns. Each of the image forming lenses is provided with an individually operable shutter which is normally closed. By opening and closing a selected one of the shutters to expose a corresponding one of the small areas to a single scene will thus provide an individual picture. Upon changing of the scene to a different scene corresponding to a second picture, another selected shutter is opened and closed to expose a corresponding another of the small areas to the different scene and thus provide the second picture in a desired spatial relationship to the one picture on the film frame in accord with the desired pattern. The steps of opening and closing a selected shutter each time a scene is changed may be rapidly repeated to thereby provide the individual pictures on the single frame without the necessity of moving the film frame or camera.

In a preferred form of apparatus for carrying out the method, a single stationary camera in provided with a film gate for supporting and positioning a film frame. Means defining a plurality of individual image forming lenses which may be in the form of a single integral plate of glass upon which rows and columns of lenses are formed is positioned in front of the gate to project multiple images of any particular scene disposed in front of the camera on the film frame, the images respectively occupying the small areas in the desired pattern. This particular picture may be imaged onto any one selected small area of the film frame by opening the corresponding shutter associated with that individual lens positioned to project the image on such area all of the other shutters remaining closed. The next picture or scene can be changed and another shutter opened and closed to effect another exposure in a desired position relative to the first exposure.

Since the shutters may be operated extremely rapidly in any desired sequence or pattern, it is a very simple matter to arrange the various pictures on the film in any desired pattern.

A feature of the invention contemplates synchronizing the changing of input data with the operation of the shutters such that computer output data displayed on a cathode ray tube can easily be recorded on a film frame extremely rapidly. Thus, the shutters can be electrically operated in a desired sequence in response to a control signal generated each time the picture on the cathode ray tube changes.

The concept of utilizing a multiple image forming lens can also be incorporated in a readout or projection system wherein any desired individual picture on a particular frame can readily be selected by simply opening a corresponding shutter to enable projection of such picture on a common screen.

BRIEF DESCRIPTION OF THE DRAWINGS

A better understanding will be had by now referring to the accompanying drawings, in which.

Figure 1:
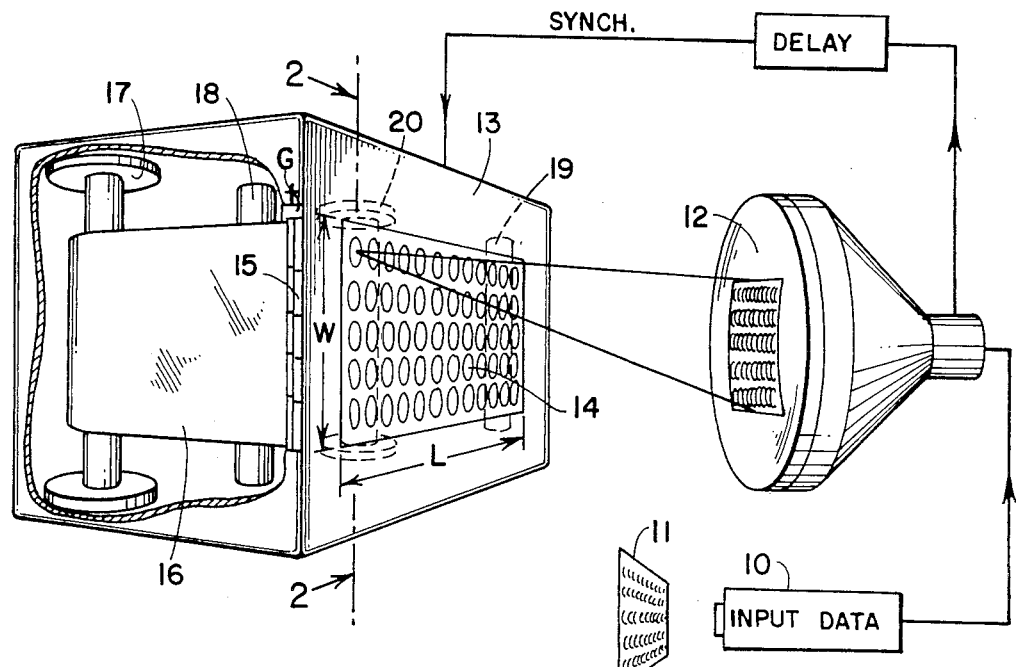
FIG. 1 is a perspective view partly cut away showing a camera enabling successive exposure of small areas on a given film frame from data displayed on a cathode ray tube all in accord with the invention.

DETAILED DESCRIPTION OF THE INVENTION:

Referring first to the lower right hand portion of FIG. 1, there is indicated by the block 10 a data recorder which might take the form of a TV camera arranged to pick up data such as a picture 11 or a page of text and display the same on the face of a cathode ray tube 12. The scene or picture on the cathode ray tube 12 may be rapidly changed by substituting various data sheets or scenes for the page 11 in front of the block 10. Alternatively, the scene or picture on the cathode ray tube may simply change at a rapid rate in accord with computer data fed to the cathode ray tube. In either event, the displayed data is to be successively recorded on a film frame such as microfiche wherein small areas of the film frame successively exposed to the successive output data or pictures on the cathode ray tube.

In accord with the present invention, such recording is effected by the camera 13 which is provided with means defining a plurality of individual image forming lenses 14 positioned in front of a gate means G. The length and width of the means defining the multiple image lenses 14 shown by the letters L and W correspond to the length and width of a single film frame supported in the gate means G. Individually operable normally closed shutter means 15 for each of the individual image forming lenses 14 are positioned between the gate means G and the multiple image forming lens structure. A film 16 is shown extending from a supply reel 17, about a guide roller 18, through the gate means G, guide roller 19, and to a pick up reel 20.

The particular embodiment illustrated in FIG. 1 also includes a synchronizing line 21 passing from the cathode ray tube 12 to the shutter means 15 in the camera. This synchronizing line may include a delay D the purpose for which will become clearer as the description proceeds.

Figure 2:
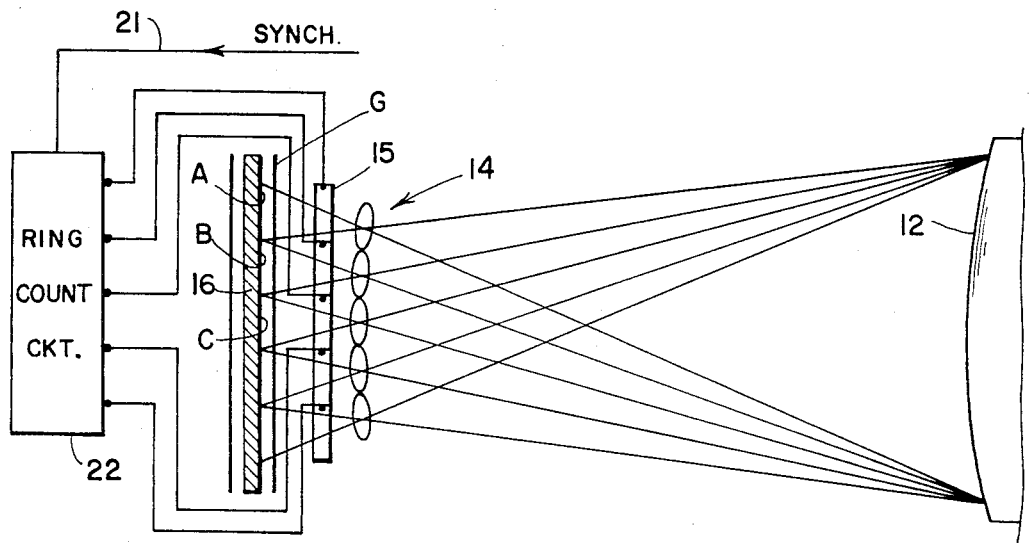
FIG. 2 is a cross section partly schematic in form taken in the direction of the arrows 2—2 of FIG. 1.

Referring to FIG. 2, it will be noted that the individual lenses making up the multiple image lens structure 14 are carefully designed and positioned such that any one single scene on the face of the cathode ray tube 12 will be imaged onto each of the small areas of the film frame assuming that all of the shutter means 15 are opened. Accordingly, it is possible to select any one of the small areas of the film frame and have the particular scene displayed on the cathode ray tube image onto that selected area by opening only the corresponding shutter of the corresponding lens portion of the multiple lenses and making sure that all of the other remaining shutters are closed.

In FIG. 2, the synchronizing line 21 is shown passing to a ring counting circuit 22. Multiple outlets from the ring counting circuit are connnected to the individual shutters 15 such that opening and closing of a particular shutter will take place when a signal appears on the corresponding output line.

Figure 3:
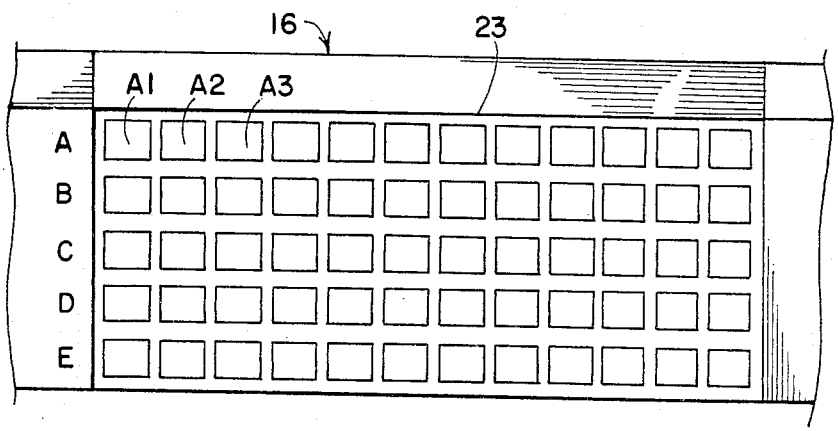
FIG. 3 is a fragmentary plan view of a film frame showing rows and columns of small areas which may be successively exposed by means of the camera arrangement of FIG. 1; and, FIG. 4 is a perspective cut away view of a readout device or projector for enabling the viewing of any selected picture on a film frame such as that shown in FIG. 3 in accord with the invention.

FIG. 3 illustrates a single frame of the film 16 wherein individual areas A-1, A-2, A-3 and so forth defining a row of exposable areas on the film are shown. A plurality of such rows as designated by the letters A, B, C, D, and E may be provided. Thus, the particular film frame 23 shown in FIG. 3 constitutes sixty individual pictures. Accordingly, there would be provided 60 individual image forming lenses making up the overall multiple image lens 14 described in FIGS. 1 and 2 and 60 corresponding individual shutters 15. There would also be provided sixty outputs from the ring counter 22.

OPERATION

In operation, assume for the sake of a specific example that it is desired to record on a single frame a treatise which contains sixty individual pages of information. In this event, a frame from the film 16 on supply reel 17 is stationarily positioned in the gate means G of the camera of FIG. 1. A first page of the data to be recorded is then displayed on the cathode ray tube 12. As mentioned, the various shutter means 15 are all normally closed. At the time the first picture is displayed on the cathode ray tube 12, a signal is generates which passes through the synchronizing line 21 after being delayed slightly by the delay D to assure that the picture on the tube 12 is steady. This signal passes into the ring counter 22 of FIG. 2 and a pulse will appear on a first output line to the shutter means corresponding to the upper left hand lens of the multiple image lens structure 14 opening and closing to thereby expose the small area A-1 shown in FIG. 3 to the displayed picture. Since all the other shutters are closed, only the small area A-1 will be exposed.

A second page of the data to be recorded is then displayed on the tube and changing of the scene or picture on the tube automatically results in the generation of a second pulse on the synchronizing line 21 after being delayed slightly to permit complete changing of the picture. This second pulse goes into the ring counter 22 of FIG. 2 and results in an output signal on the second output terminal which connects to the next shutter in the row of shutters to thereby open and close this second shutter and expose the small area A-2 shown in FIG. 3, all of the other shutters being closed so that only this second area is exposed.

The foregoing process may simply be repeated, the ring counter functioning to accumulate the pulses and operate a selected shutter connected to that output from the ring counter on which a pulse appears. Thus, all sixty of the small areas of the film frame may be very rapidly sequentially exposed without the necessity of moving either the film or the camera.

By providing the synchronizing signal operating in cooperation with the shutters, it will be evident that extremely rapid recording of data on a microfiche can be achieved and thus the system lends itself well to the recording of computer output data displayed on a cathode ray tube.

PROJECTION SYSTEM

Figure 4:
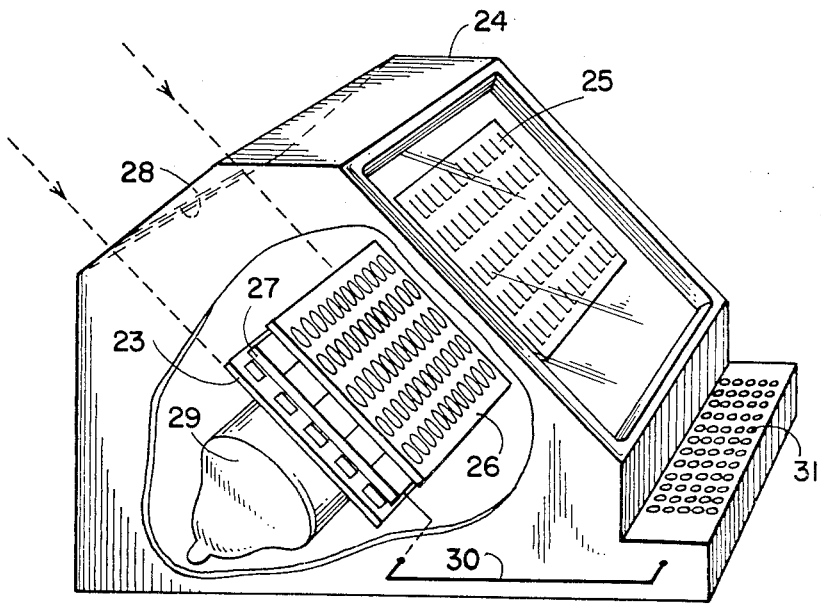

FIG. 4 illustrates a simple projection system incorporating certain principles of the method and apparatus of the invention as described in conjunction with FIGS. 1 to 3. Thus there is shown a readout projector 24 having a screen 25 serving as a common screen for a plurality of individual projection lenses 26. A shutter means including individually operable shutters associated with each of the individual lenses making up the structure 26 is shown at 27 positioned behind the multiple projection lenses. In back of the shutter means the single microfiche film frame 23 may be positioned as by passing the same through a suitable guide slot 28 in the top portion of the projector 24. A light source 29 in turn is positioned behind the film frame 23.

The projection system is completed by a connecting cable 30 from the various shutters 27 to a plurality of controlled buttons 31 on the front of the projector 24. Each control button 31 when depressed will open a correspondingly connected individual shutter in the shutter means 27 to thereby permit projection through the corresponding lens of that particular area of the film frame 23 to be viewed.

It will be evident from the above, that any selected individual picture on the film frame may be immediately projected onto the screen 25 without the moving of either the film or the projection system.

While the present invention has been described in conjunction with microfiche film, it will be evident that the method and apparatus is applicable to any situation in which it is desired to record rapidly a number of small pictures on a given film frame in any desired pattern.

What is claimed is:

1. A multiple image film exposure system comprising, in combination: display means for successively displaying a plurality of pictures to be photographed onto a single film frame to provide a plurality of individual pictures on small areas on said frame in a desired pattern; a camera including gate means for supporting said film frame; means defining a plurality of individual image forming lenses positioned in front of said gate means to project multiple images of one of said pictures on said film frame, said images respectively occupying said small areas in said desired pattern; an individually operable normally closed shutter means for each of said individual image forming lenses so that opening and closing of a selected shutter means exposes a corresponding area of said film frame to the particular picture displayed by said displaying means; a synchronizing means connected between said display means and said individually operable shutter means for automatically successively opening and closing said shutter means in a sequence defining said desired pattern, said synchronizing means including means for generating a different control signal in response to changing of a picture on said display means, each of said shutter means being responsive to a particular control signal received to open and close; and a delay means for delaying the arrival of the control signal to assure that the shutter to be operated is not operated until the picture to be displayed is steady.

* * * * *